United States Patent [19]
Manabe

[11] Patent Number: 6,101,341
[45] Date of Patent: Aug. 8, 2000

[54] PHOTOGRAPHIC CAMERA

[75] Inventor: Mitsuo Manabe, Saitama-ken, Japan

[73] Assignee: Fuji Photo Optical Co., Ltd., Saitama-ken, Japan

[21] Appl. No.: 09/243,490

[22] Filed: Feb. 3, 1999

[30]  Foreign Application Priority Data

Feb. 4, 1998 [JP] Japan .................................. 10-023315

[51] Int. Cl.[7] .................................................. G03B 17/24
[52] U.S. Cl. ............................................ 396/536; 396/538
[58] Field of Search .................................... 396/536, 537, 396/538

[56]  References Cited

U.S. PATENT DOCUMENTS

| 5,729,784 | 3/1998 | Naka et al. | 396/538 |
| 5,752,120 | 5/1998 | Tanaka | 396/538 |
| 5,754,912 | 5/1998 | Kobayashi . | |

Primary Examiner—David M. Gray

Attorney, Agent, or Firm—Nixon Peabody LLP; Donald R. Studebaker

[57] ABSTRACT

A photographic camera is provided with a cartridge chamber in which a film cartridge is loaded. A chamber lid is movable between an opening position in which it opens an entrance opening to the cartridge chamber and a closed position in which it closes the entrance opening. A lock lever is moved to a locking position in response to movement of the chamber lid to the closed position to lock the chamber lid in the closed position and is moved to an unlocking position to release the chamber lid in response to an operation for opening the chamber lid. The lock lever is urged toward the locking position by a spring. A lifter is disposed in a first position where it is brought into abutment against the film cartridge when the film cartridge is loaded in the cartridge chamber, is moved by the film cartridge in response to loading of the film cartridge in the cartridge chamber to a second position where it can be brought into abutment against the chamber lid when the chamber lid is moved to the closed position, and is moved, by the chamber lid in response to movement of the chamber lid to the closed position, to a third position where it is away from the film cartridge. the lifter is urged toward the first position by the spring which urges the lock lever.

2 Claims, 9 Drawing Sheets

PHOTOGRAPHIC CAMERA

BACKGROUND OF THE INVENTION

1. Field of the Invention

This invention relates a photographic camera provided with a cartridge chamber in which a film cartridge is loaded.

2. Description of the Related Art

Recently there has been proposed a film cartridge having a film exit slit and a light-shielding shutter member for opening and closing the film exit slit. In such a film cartridge, when the film exit slit is closed by the shutter member, the roll film is entirely rolled around a spool to its leading end and held in a light-tight fashion and the roll film is fed out of the cartridge body and rewound into the cartridge body with the film exit slit opened. See, for instance, U.S. Pat. No. 5,025,274.

Further there have proposed various photographic cameras which use such a film cartridge. Generally such a photographic camera is provided with a cartridge chamber in which the film cartridge is loaded, a chamber lid which opens and closes an entrance opening to the cartridge chamber, a lock lever which is moved to a locking position in response to closure of the chamber lid to lock the chamber lid in the closed position and is moved to an unlocking position to release the chamber lid in response to an operation for opening the chamber lid, a spool drive member which is engaged with the spool of the film cartridge loaded in the cartridge chamber and is driven in the regular direction or the reverse direction by a motor to rotate the spool to feed out and rewind the film from and into the cartridge body, and a shutter member opening/closing member which is engaged with the light-shielding shutter member of the film cartridge and opens and closes the film exit slit. The film cartridge loaded in the cartridge chamber is in engagement with only the spool drive member and the cartridge body is floated in the cartridge chamber.

When film cartridge is to be taken out from the cartridge chamber, the light-shielding shutter member must be disengaged from the shutter member opening/closing member. For this purpose, the cartridge chamber is provided with a lifter member which disengages the shutter member from the opening/closing member and facilitates taking out the film cartridge. The lifter member is urged toward the entrance opening to the cartridge chamber by a spring and is pushed away from the initial position overcoming the force of the spring by the leading end face of the film cartridge when the film cartridge is inserted into the cartridge chamber. The lifter member is moved to a retracted position away from the film cartridge in response to closure of the chamber lid, thereby causing the film cartridge to float in the cartridge chamber. When the chamber lid is opened, the lifter member is moved toward the entrance opening under the force of the spring and pushes the film cartridge toward the entrance opening, thereby disengaging the shutter member from the opening/closing member and ejecting the film cartridge from the cartridge chamber.

Further, there has been known a photographic camera using a film cartridge which is provided with first and second lifter members. In such a camera, the first and second lifter member are spring-urged toward the entrance opening to the cartridge chamber and are respectively brought into abutment against the chamber lid and the film cartridge loaded in the cartridge chamber. When there is no film cartridge loaded in the cartridge chamber, only the first lifter member is moved toward the entrance opening and when a film cartridge is loaded in the cartridge chamber, the first lifter member moves the second lifter member to a retracted position away from the film cartridge in response to closure of the chamber lid. When the chamber lid is opened, the second lifter member is moved toward the entrance opening under the force of the spring and pushes the film cartridge toward the entrance opening, thereby disengaging the shutter member from the opening/closing member.

In order to disengage the shutter member from the opening/closing member and eject the film cartridge from the cartridge chamber, it is necessary that the force of the spring urging the lifter member toward the entrance opening is relatively strong, e.g., about 300 g. However when a spring having a large force is used, the lifter and the spring mounting structure of the camera body must be arranged to withstand the large spring force, which adds to the sizes of these parts and the overall size of the camera. Further, the spring which urges the lifter member, especially the springs which respectively urge the first and second lifter members, adds to the number of components of the camera, thereby adding to the manufacturing cost of the camera.

SUMMARY OF THE INVENTION

In view of the foregoing observations and description, the primary object of the present invention is to provide a photographic camera of a type using a film cartridge which can be compact in size and can be manufactured at low cost.

In accordance with the present invention, there is provided a photographic camera comprising a cartridge chamber in which a film cartridge is loaded, a chamber lid which is movable between an opening position in which it opens an entrance opening to the cartridge chamber and a closed position in which it closes the entrance opening, a lock means which is moved to a locking position in response to movement of the chamber lid to the closed position to lock the chamber lid in the closed position and is moved to an unlocking position to release the chamber lid in response to an operation for opening the chamber lid, the lock means being urged toward the locking position by an urging means, a lifter means which is disposed in a first position where it is brought into abutment against the film cartridge when the film cartridge is loaded in the cartridge chamber, is moved by the film cartridge in response to loading of the film cartridge in the cartridge chamber to a second position where it can be brought into abutment against the chamber lid when the chamber lid is moved to the closed position, and is moved, by the chamber lid in response to movement of the chamber lid to the closed position, to a third position where it is away from the film cartridge, the lifter means being urged toward the first position by an urging means, wherein the urging means which urges the lock means toward the locking position doubles the urging means which urges the lifter means toward the first position.

In one embodiment, said urging means is a spring which is connected to the lock means at one end and to the lifter means at the other end.

It is preferred that the photographic camera of the present invention further comprises a display window formed on the camera body outside the cartridge chamber, and a display means which makes, in response to movement of the lifter means to the third position, a display which indicates presence of the film cartridge in the cartridge chamber and is able to be seen through the display window.

In the photographic camera of the present invention, the lifter means is moved from the first position to the second position by the film cartridge in response to loading of the film cartridge in the cartridge chamber and is moved from the second position to the third position in response to closure of the chamber lid. Since the single urging means urges the lifter member toward the first position and the lock means toward the locking position, the urging force of the urging means is increased in response to movement of the lifter means to the third position. However since the lock means is moved to the locking position in response to closure of the chamber lid, the urging force of the urging means is weakened in response to closure of the chamber lid. When the chamber lid is opened with the film cartridge loaded in the cartridge chamber, the lock means is moved to the unlocking position and accordingly the urging force is increased. Accordingly the lifter means pushes the film cartridge toward the entrance opening under the increased urging force of the urging means and the film cartridge is ejected from the cartridge chamber. When the chamber lid is closed with no film cartridge loaded in the cartridge chamber, the lifter means is kept in the first position and accordingly the urging force of the urging means is held weak.

Thus in the photographic camera of this embodiment, the urging force of the urging means is strong sufficiently to eject the film cartridge from the cartridge chamber only for an instant the chamber lid is opened and the lock means is moved to the unlocking position and the urging force is weak in the state where the chamber lid is closed. Accordingly, the lifter means and the lock means are not subjected to a strong force for a long time, and the lifter means and the lock means need not be strong in structure, which simplifies the structure of the camera. Further since a single urging means doubles a means for urging the lifter toward the first position with a means for urging the lock means in the locking position, the number of the components of the camera can be reduced and the manufacturing cost of the camera is reduced.

Further, when the chamber lid is closed with a film cartridge loaded in the cartridge chamber and the lifter means is moved to the third position away from the film cartridge, the display means makes a display which indicates presence of the film cartridge in the cartridge chamber. On the other hand, when the chamber lid is closed with no film cartridge loaded in the cartridge chamber, the lifter means is not moved to the third position, and accordingly the display means makes no display which indicates absence of the film cartridge in the cartridge chamber. Thus absence and presence of the film cartridge in the cartridge chamber can be easily shown.

DESCRIPTION OF THE PREFERRED EMBODIMENT

In FIGS. 1 to 9, a photographic camera 10 in accordance with an embodiment of the present invention has a cartridge chamber 12 which is for receiving a film cartridge 1 and is formed in one side of a camera body 11. The entrance opening to the cartridge chamber 12 which opens in the bottom of the camera body 11 is opened and closed by a chamber lid 13 which is supported for rotation on a pivot 11a formed on the bottom of the camera body 11. An opening 15 which gives an engagement portion 13a of the chamber lid 13 access to an engagement portion 16a of a lock lever 16 (FIG. 3) is formed in the bottom of the camera body 11 at its one end.

Figure 1:
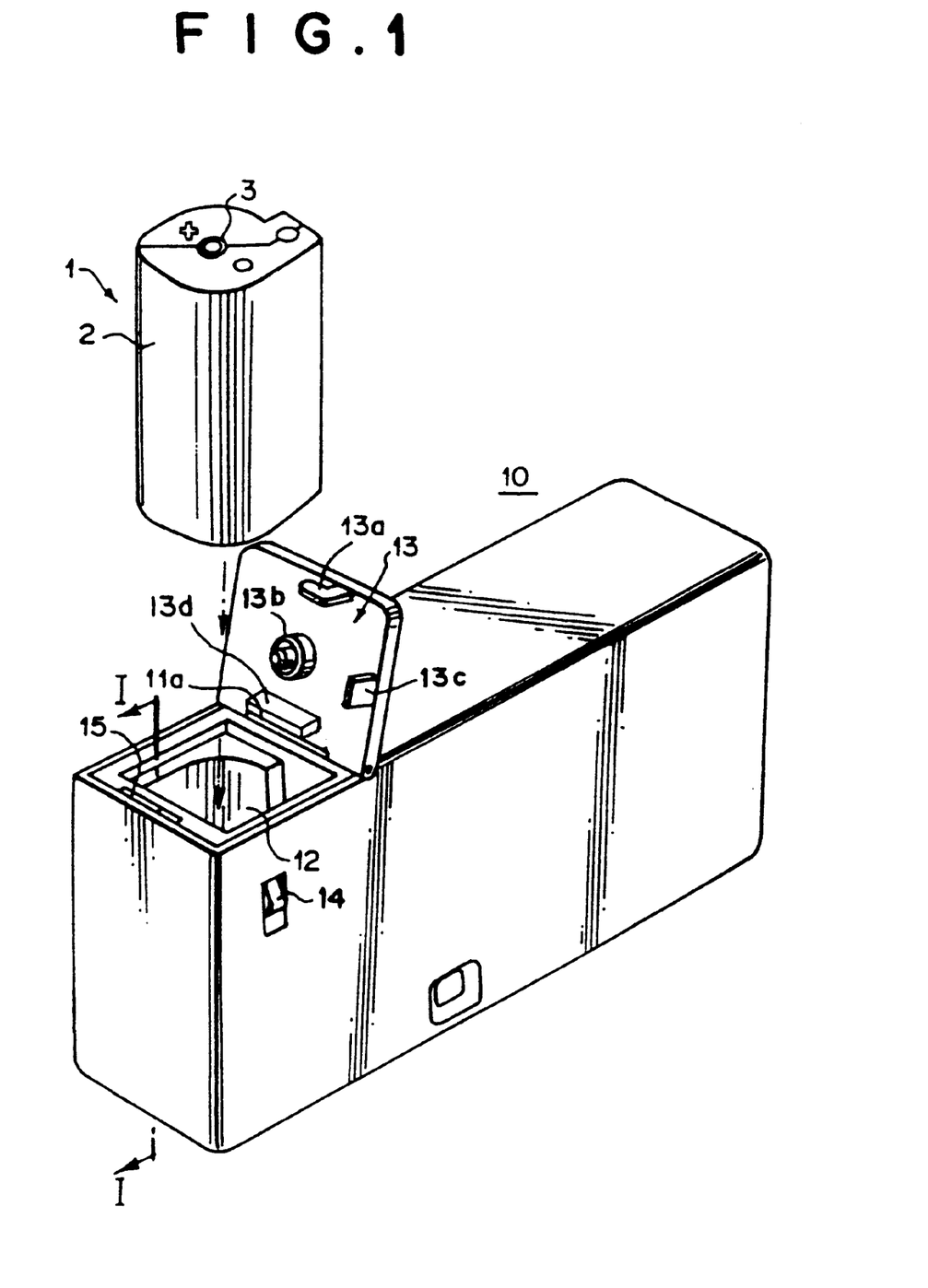
FIG. 1 is a perspective view of a photographic camera in accordance with an embodiment of the present invention with the camera body positioned upside down showing loading of a film cartridge in the camera.

Further, a cartridge pressing member 13b which presses the film cartridge 1 against a spool drive member (not shown) provided on the bottom (closed end) of the cartridge chamber 12, a projection 13c which pushes a lifter member to be described later and a rib 13d which is brought into abutment against the film cartridge 1 to push the film cartridge 1 into the cartridge chamber 12 when the chamber lid 13 is closed are provided on the inner side of the chamber lid 13.

Figure 2:
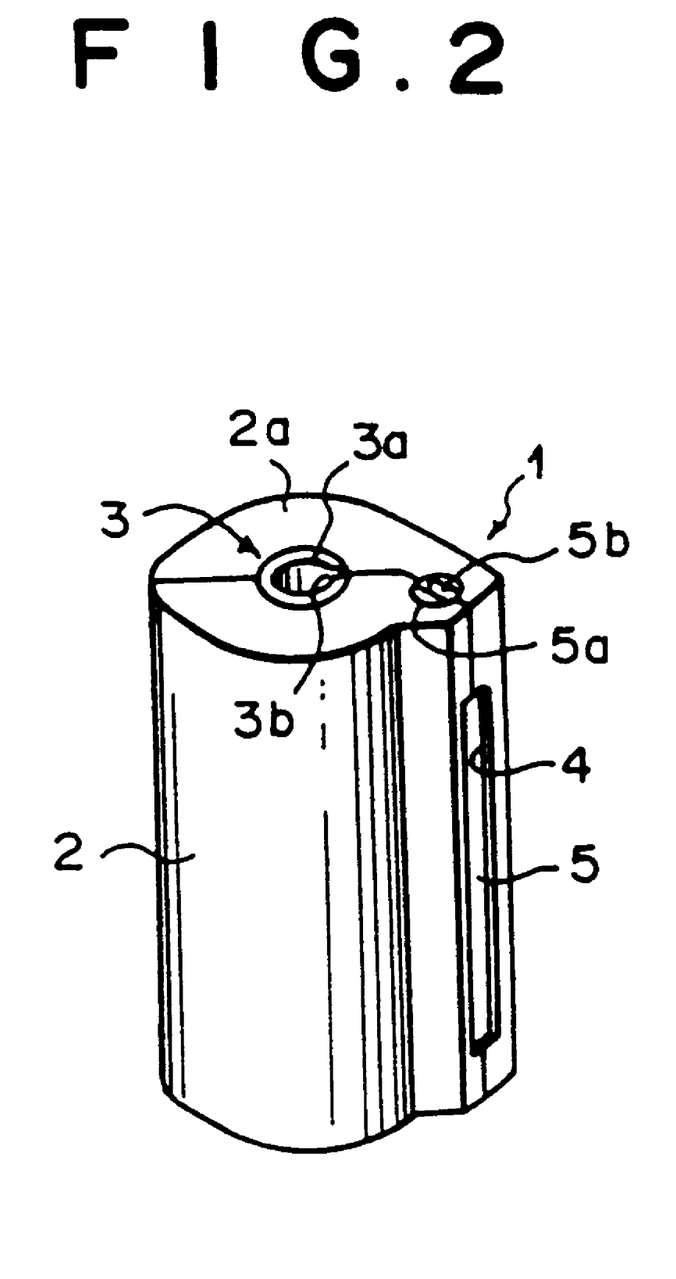
FIG. 2 is a perspective view showing the film cartridge in the position reverse to that in FIG. 1.

As shown in FIG. 2, the film cartridge 1 comprises a cartridge body 2 formed of resin molding halves bonded together and a photographic roll film (not shown) entirely rolled around a spool 3 in the cartridge body 2 to its leading end. A film exit slit 4 is formed in the side surface of the cartridge body 2 and a light-shielding shutter member 5 is supported for rotation through about 90° in the film exit slit 4 to open and shut the film exit slit 4. The shutter member 5 extends in parallel to the spool 3 and is provided with a cutaway portion 5b at one end portion 5a which is exposed in the end face 2a of the cartridge body 2 from which the film cartridge 1 is inserted into the cartridge chamber 12 (positioned up in FIG. 2 and down in FIG. 1; this end face will be referred to as "the upper end face", hereinbelow). The end portion 5a is engaged with a shutter member opening/closing member (not shown) disposed in the cartridge chamber 12 which rotates the shutter member 5 between an opening position where it opens the film exit slit 4 and a closed position where it closes the same.

As shown in FIG. 2, a keyway 3b is formed on the end 3a of the spool 3 which is exposed in the upper end face 2a of the cartridge body 2. A drive member (not shown) disposed on the bottom of the cartridge chamber 12 is engaged with the cutaway portion 3b to feed out and rewind the film.

Figure 3:
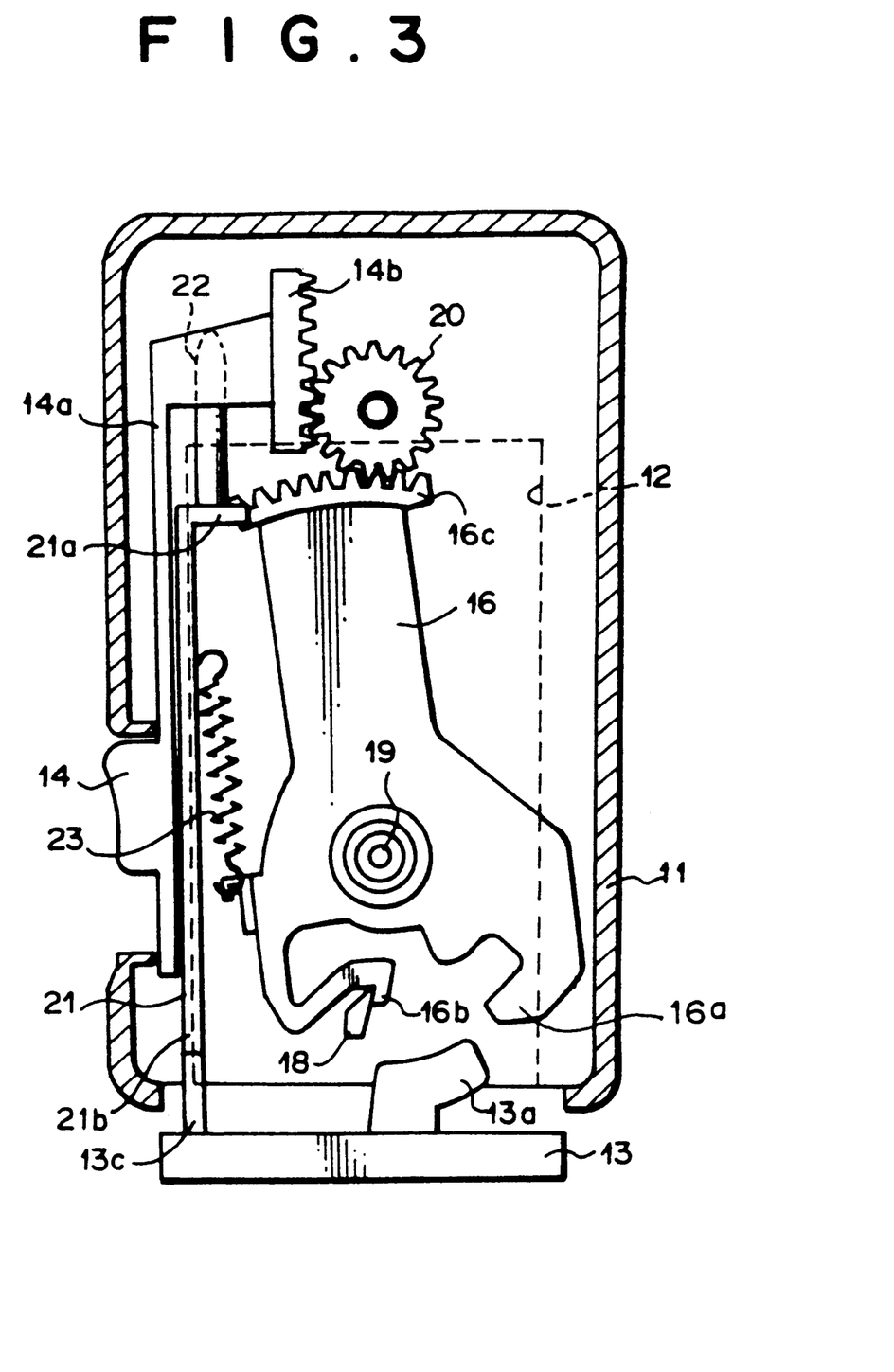
FIG. 3 is a cross-sectional view taken along line I—I in FIG. 1 with the camera body in the position reverse to that in FIG. 1 and shows the state where no film cartridge is loaded in the cartridge chamber.

As shown in FIG. 3, the aforesaid lock lever 16 is mounted by a screw 19 for rotation on an inner wall portion 40 of the camera body 11 facing the cartridge chamber 12. The lock lever 16 is rotatable between a locking position shown in FIG. 5 where it locks the chamber lid 13 in the closed position and an unlocking position shown in FIG. 3 where it releases the chamber lid 13. There are formed, on the lower end portion of the lock lever 16, the aforesaid engagement portion 16a which is brought into engagement with the engagement portion 13a of the chamber lid 13 to lock the chamber lid 13 in the closed position and a hook portion 16b which is engaged with a projection 18 on the inner wall portion 40 when the chamber lid 13 is opened and is disengaged from the projection 18 by the engagement portion 13a on the chamber lid 13 in response to closure of the chamber lid 13. A sector gear 16c is formed on the upper end of the lock lever 16 and in mesh with a gear 20 supported for rotation above the lock lever 16. A knob 14 for rotating the lock lever 16 to the unlocking position to release the chamber lid 13 from the lock lever 16 as will become apparent later is exposed in the rear face of the camera body 11. The knob 14 has an extension 14a which extends upward. A rack 14b is formed on the upper end of the extension 14a and in mesh with the gear 20. As will be described later, when the chamber lid 13 is closed, the knob 14 is moved downward to a position shown in FIG. 5 and when the knob 14 is moved upward from the position shown in FIG. 5 to the position shown in FIG. 3, the chamber lid 13 is released from the lock lever 16 and opened.

Figure 7:
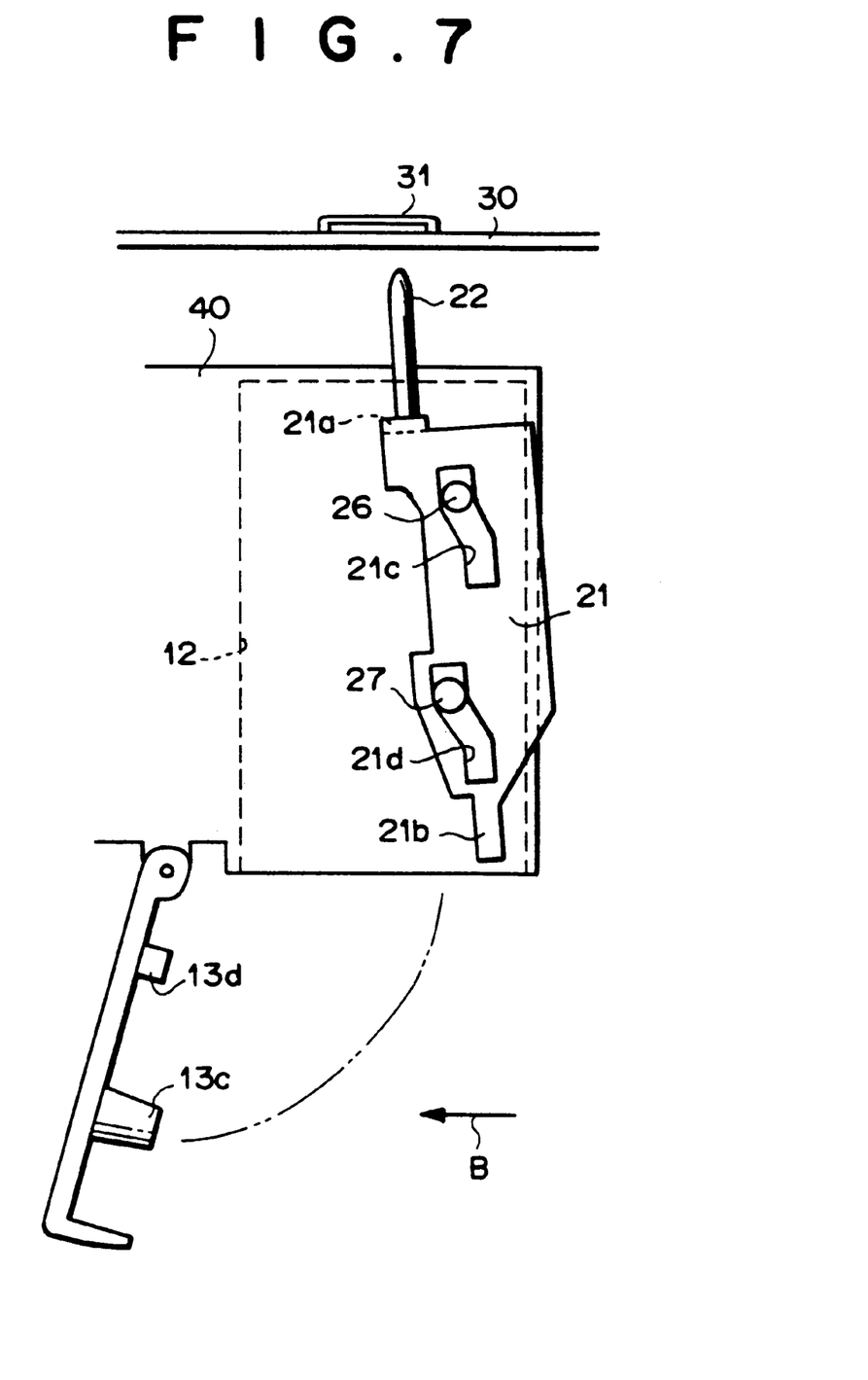
FIG. 7 is a view showing the position of the lifter when no film cartridge is in the cartridge chamber.
Figure 9:
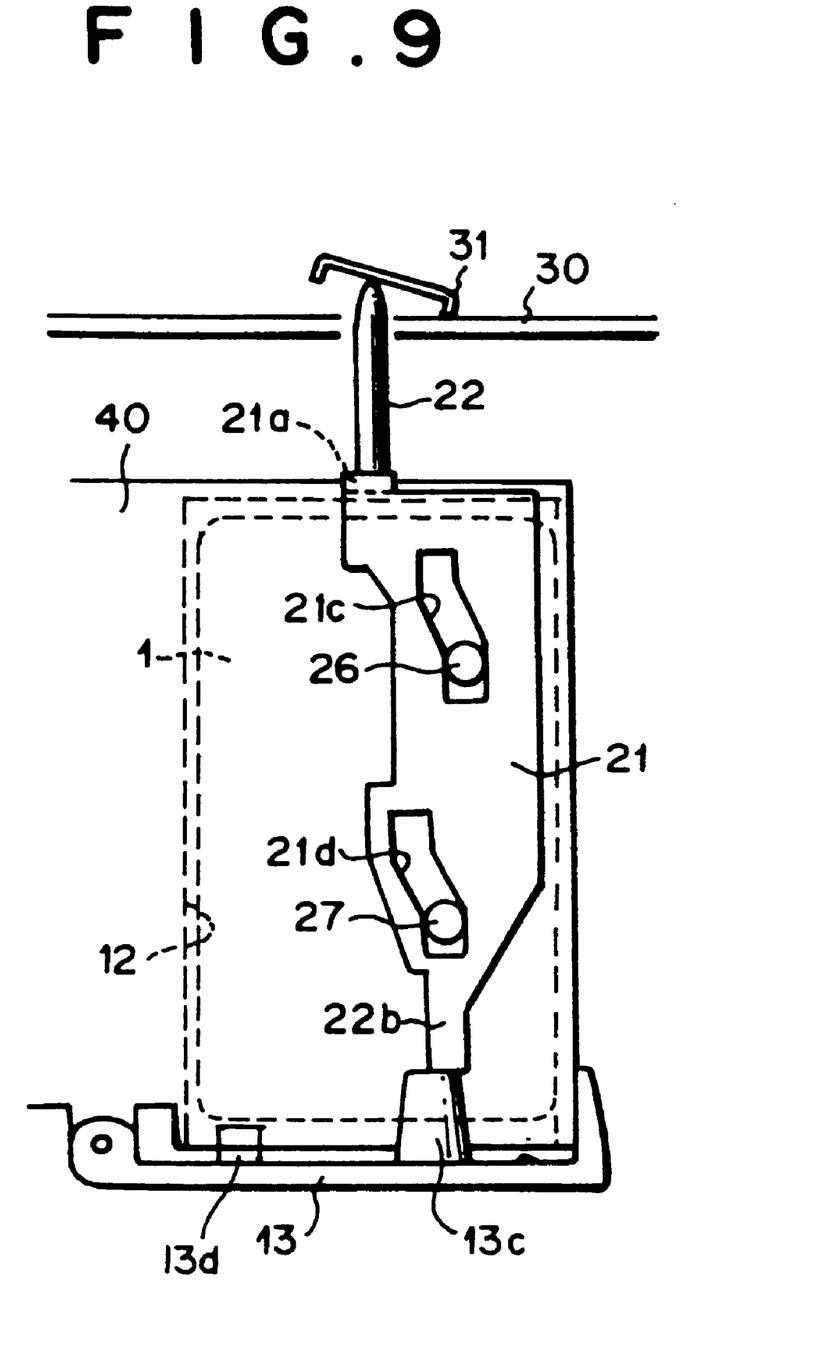
FIG. 9 is a view similar to FIG. 8 but showing the state where the chamber lid is closed.

As shown in FIG. 7, a lifter 21 is mounted on the inner wall portion 40 on the rear side of the camera body 11 to be movable up and down. The lifter 21 comprises an abutment portion 21a which projects into the cartridge chamber 12 to be brought into engagement with the upper end face 2a of the film cartridge 1 when the film cartridge 1 is loaded in the cartridge chamber 12, an abutment portion 21b which is brought into abutment against the projection 13c on the inner side of the chamber lid 13 when the chamber lid 13 is closed, and a pair of cam grooves 21c and 21d in which a pair of pins 26 and 27 are respectively fitted. Since the cam grooves 21c and 21d are bent as shown in FIG. 7 so that the lifter 21 is moved in the direction of arrow B as it is moved upward. A projection 22 for opening and closing a switch 31 provided on a circuit board 30 extends upward from the upper end of the lifter 21. A display means (not shown) such as a liquid crystal panel for showing existence or absence of a film cartridge 1 in the cartridge chamber 12 through a window (not shown) provided on the camera body 11 is provided on the circuit board 30. The switch 31 is for turning on and off the display means and is normally opened. When the switch 31 is moved upward by the projection 22 as shown in FIG. 9, the switch 31 is closed.

A spring 23 for urging the lock lever 16 in the clockwise direction in FIG. 3 is mounted between the lock lever 16 and the lifter 21.

The operation of the camera 10 of this embodiment will be described hereinbelow.

As shown in FIGS. 3 and 7, the lifter 21 is slightly inclined rightward when there is no film cartridge loaded in the cartridge chamber 12 and accordingly the projection 13c on the inner side of the chamber lid 13 cannot be brought into abutment against the abutment portion 21b of the lifter 21 upon closure of the chamber lid 13. Accordingly, even if the chamber lid 13 is fully closed, the lifter 21 is not moved upward and the projection 22 dose not close the switch 31, whereby nothing appears on the display means, which indicates absence of the film cartridge 1 in the cartridge chamber 12.

When the chamber lid 13 is fully closed, the engagement portion 13a on the chamber lid 13 is brought into abutment against the hook portion 16b of the lock lever 16 and disengages the hook portion 16b from the projection 18. Then the lock lever 16 is rotated in the clockwise direction to the locking position under the force of the spring 23 and the engagement portion 16a of the lock lever 16 is brought into engagement with the engagement portion 13a of the chamber lid 13 to lock the chamber lid 13 in the closed position. At the same time, the clockwise rotation of the lock lever 16 causes the knob 14 to move downward by way of the sector gear 16c, the gear 20 and the rack 14b.

When the knob 14 is manually moved upward, the lock lever 16 is rotated in the counterclockwise direction to the unlocking position by way of the sector gear 16c, the gear 20 and the rack 14b and the engagement portion 13a is disengaged from the engagement portion 16a, whereby the chamber lid 13 is opened. At the same time, the hook portion 16b of the lock lever 16 is brought into engagement with the projection 18 to hold the lock lever 16 in the unlocking position.

Figure 4:
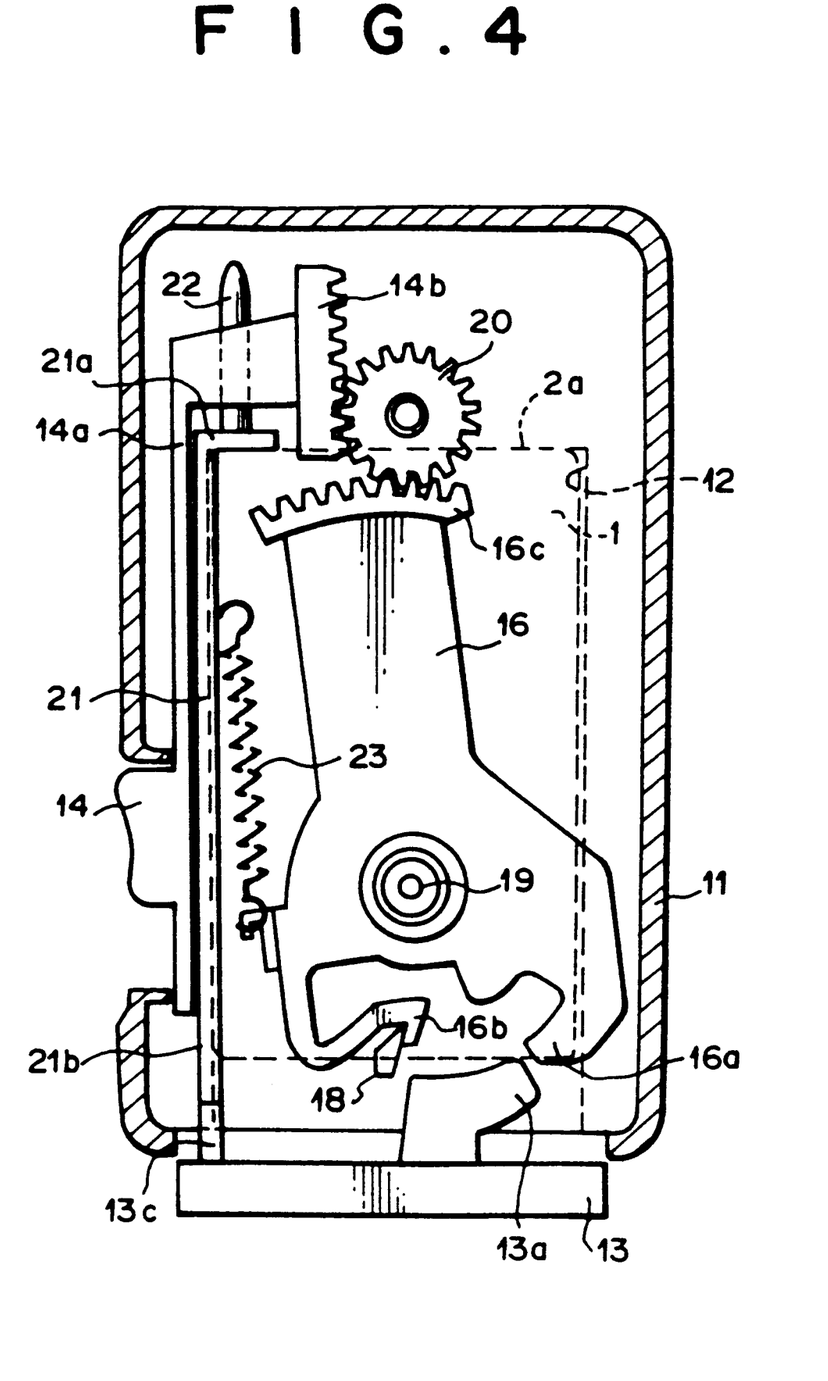
FIG. 4 is a cross-sectional view taken along line I—I in FIG. 1 with the camera body in the position reverse to that in FIG. 1 and shows the state where a film cartridge is loaded in the cartridge chamber.
Figure 8:
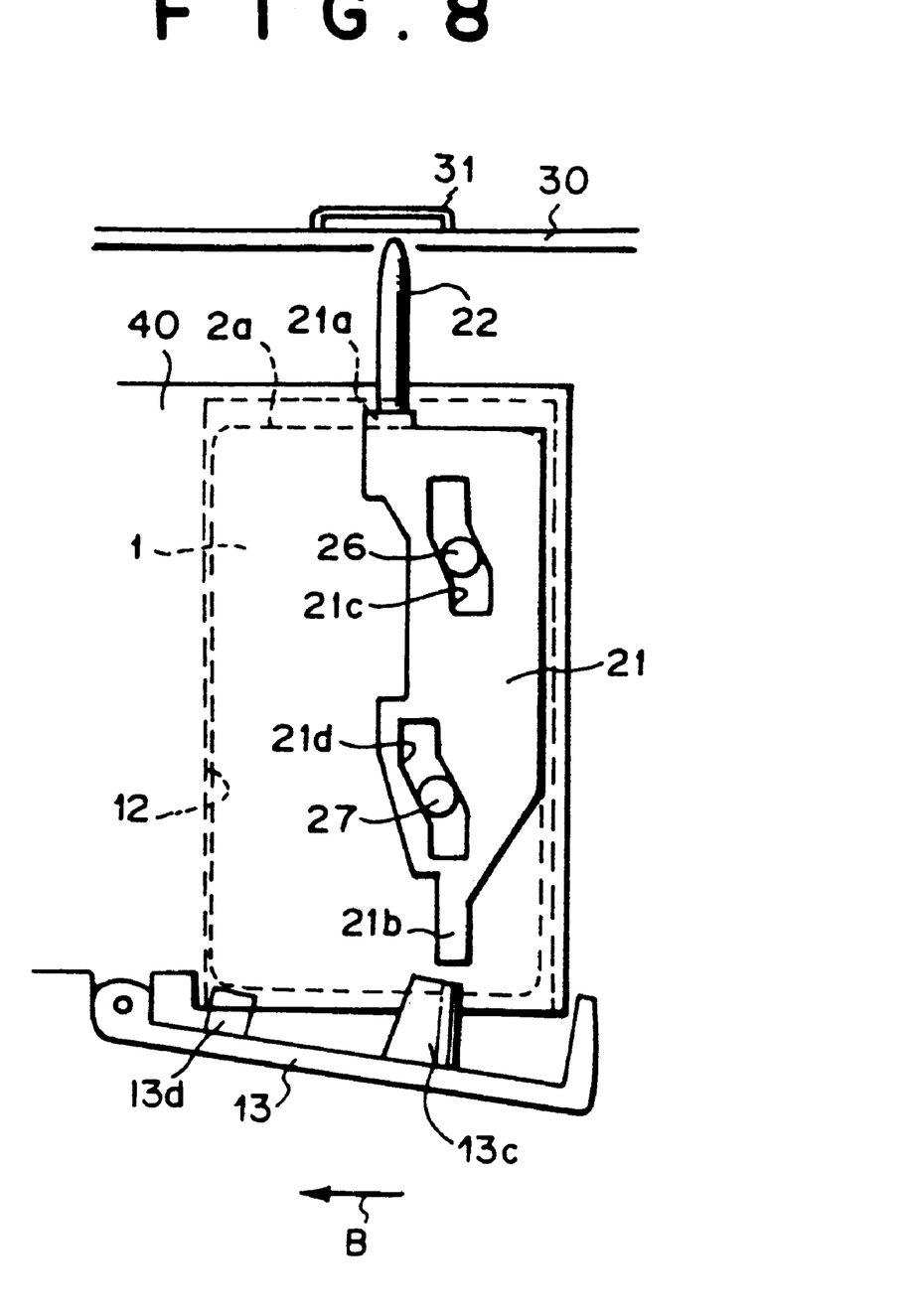
FIG. 8 is a view showing the position of the lifter when a film cartridge is in the cartridge chamber.

When the film cartridge 1 is inserted into the cartridge chamber 13, the upper end face 2a of the film cartridge 1 is brought into abutment against the abutment portion 21a of the lifter 21 and the lifter 21 is moved upward until the upper end face 2a of the film cartridge 1 abuts against the bottom of the cartridge chamber 12, whereby the lifter 21 is moved also in the direction of arrow B by virtue of the cam grooves 21c and 21d and comes to erect as shown in FIGS. 4 and 8. In this state, the projection 13c on the inner side of the chamber lid 13 is brought into abutment against the abutment portion 21b of the lifter 21 in response to closure of the chamber lid 13. Accordingly when the chamber lid 13 is closed, the lifter 21 is moved further upward overcoming the force of the spring 23 and at the same time, the film cartridge 1 is inserted deep into the cartridge chamber 12 by way of abutment of the rib 13d and the film cartridge 1.

Figure 5:
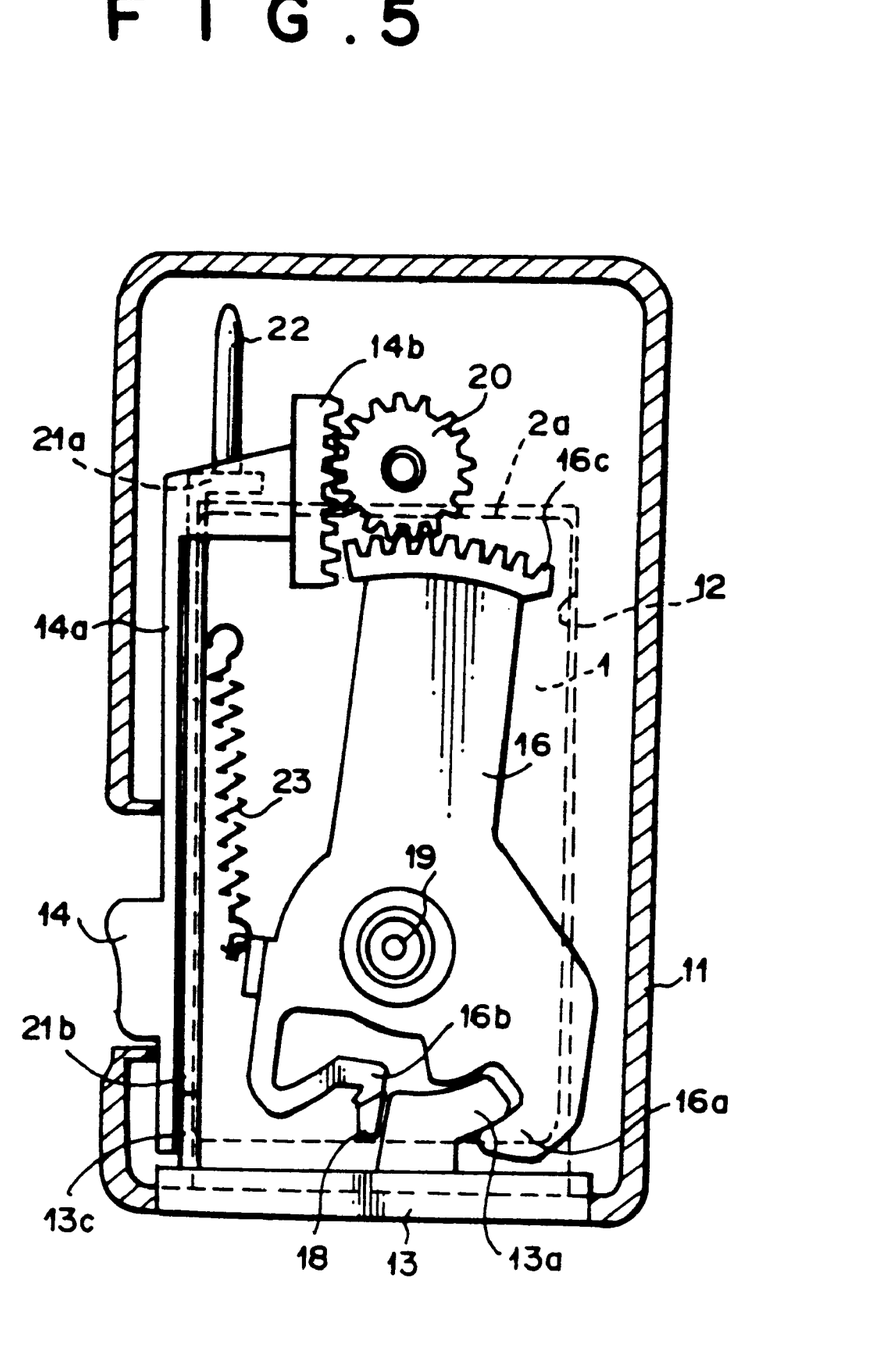
FIG. 5 is a cross-sectional view taken along line I—I in FIG. 1 with the camera body in the position reverse to that in FIG. 1 and shows the state where the film cartridge is loaded in the cartridge chamber and the chamber lid is closed.
Figure 6:
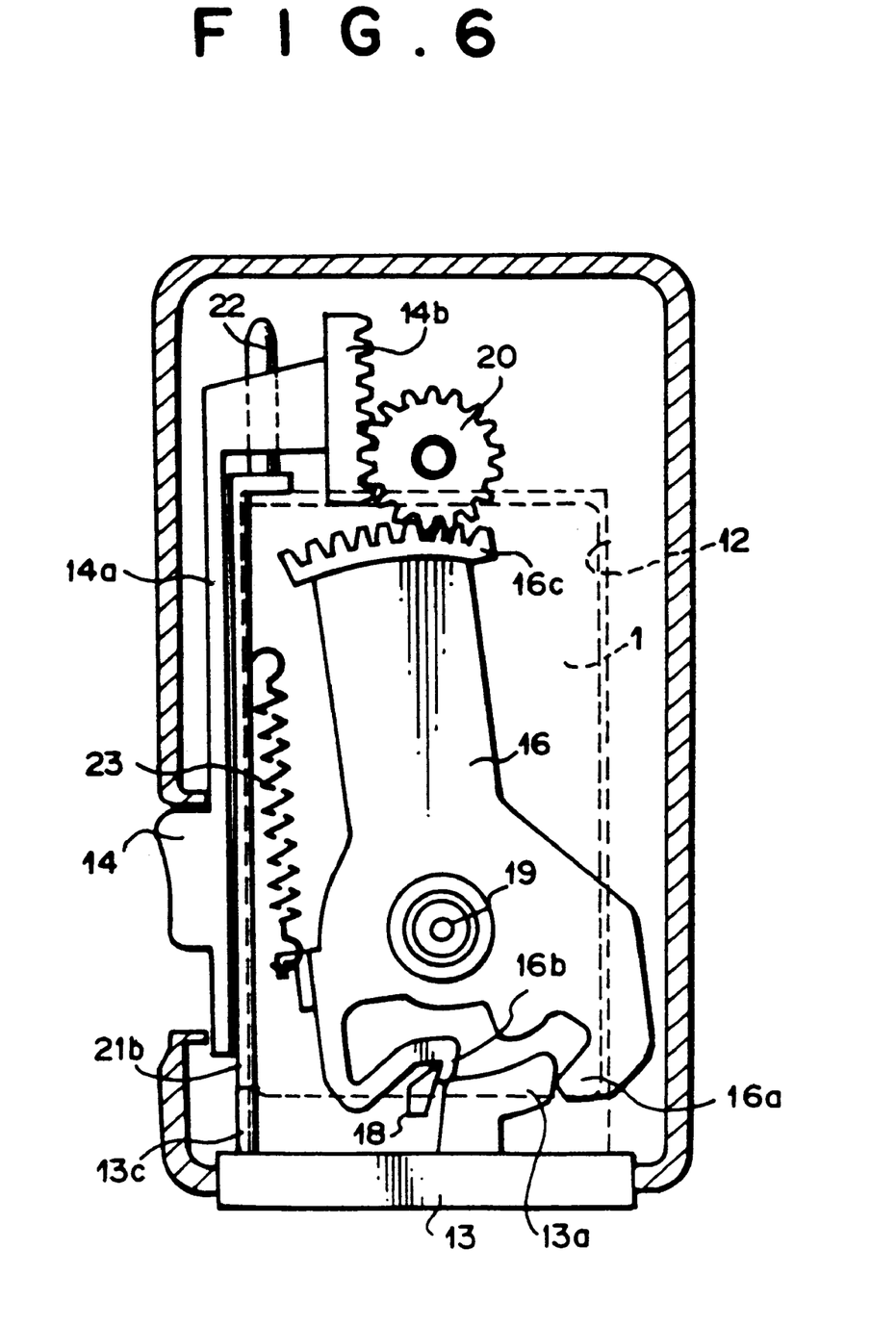
FIG. 6 is a cross-sectional view taken along line I—I in FIG. 1 with the camera body in the position reverse to that in FIG. 1 and shows the state where the film cartridge is loaded in the cartridge chamber and the chamber lid is opened.

As shown in FIGS. 5 and 9, in the state where the chamber lid 13 is fully closed, the lifter 21 is in the uppermost position and the projection 22 closes the switch 31, whereby the display means makes a display which indicates presence of the film cartridge 1 in the cartridge chamber 12. Further, in this state, the abutment portion 21a of the lifter 21 is held away from the end face 2a of the film cartridge 1 and the rib 13d is held away from the film cartridge 1, whereby the film cartridge 1 is held in a floating state in the cartridge chamber 13 except the spool 3 is supported by the spool drive mechanism and the cartridge pressing member 13b.

When the chamber lid 13 is fully closed, the engagement portion 13a on the chamber lid 13 is brought into abutment against the hook portion 16b of the lock lever 16 and disengages the hook portion 16b from the projection 18. Then the lock lever 16 is rotated in the clockwise direction to the locking position under the force of the spring 23 while the spring 23 contacts and the engagement portion 16a of the lock lever 16 is brought into engagement with the engagement portion 13a of the chamber lid 13 to lock the chamber lid 13 in the closed position. At the same time, the clockwise rotation of the lock lever 16 causes the knob 14 to move downward by way of the sector gear 16c, the gear 20 and the rack 14b.

Just before the lock lever 16 reaches the locking position shown in FIG. 5, the lock lever 16 is in the unlocking position shown in FIG. 4 and the spring 23 is largely stretched, and accordingly the urging force of the spring 23 is relatively strong. However since the chamber lid 13 is closed in an instant, the spring 23 instantly contracts to a slightly stretched state as shown in FIG. 5. In this state, the urging force acting on the lock lever 16 and the lifter 21 is not so strong.

When the knob 14 is manually moved upward in the state shown in FIGS. 5 and 9, the lock lever 16 is rotated in the counterclockwise direction to the unlocking position by way of the sector gear 16c, the gear 20 and the rack 14b and the engagement portion 13a is disengaged from the engagement portion 16a, whereby the chamber lid 13 is opened. At the same time, the hook portion 16b of the lock lever 16 is brought into engagement with the projection 18 to hold the lock lever 16 in the unlocking position. When the lock lever 16 is moved to the unlocking position, the spring 23 is stretched and the urging force of the spring 23 is increased. The lifter 21 is moved toward the entrance opening to the cartridge chamber 12 under the increased force of the spring 23. At this time, the abutment portion 21a of the lifter 21 is brought into abutment against the end face 2a of the film cartridge 1 and pushes the film cartridge 1 toward the entrance opening to the cartridge chamber 12, whereby the film cartridge 1 is ejected from the cartridge chamber 12. Further the switch 31 is opened in response to downward movement of the lifter 21 and accordingly the display means is turned off.

After the film cartridge 1 is thus ejected from the cartridge chamber 12, the lifter 21 is returned to the position shown in FIG. 3 where stretch of the spring 23 is small. In this state, the urging force acting on the lock lever 16 and the lifter 21 is not so strong.

Thus, in this embodiment, stretch of the spring 23 is small and the urging force acting on the lock lever 16 and the lifter 21 is not so strong in the state where no film cartridge is in the cartridge chamber 12 as shown in FIG. 3 and in the state where the chamber lid 13 is in the closed position with a film cartridge 1 loaded in the cartridge chamber 13 as shown in FIG. 5. Further, when the chamber lid 13 is opened with a film cartridge 1 loaded in the cartridge chamber 12, the spring 23 is stretched and the urging force of the spring 23 is increased. However, since the spring 23 contracts in an instant while ejecting the film cartridge 1 from the cartridge chamber 12, the time for which the spring 23 is largely stretched is very short.

Thus in accordance with the present invention, the urging force of the spring 23 is strong sufficiently to eject the film cartridge 1 from the cartridge chamber 12 only for an instant the chamber lid 13 is opened and the lock lever 16 rotates in the counterclockwise direction (FIG. 6) and the urging force is weak in the state where the chamber lid 13 is closed. Accordingly, the lifter 21 and the lock lever 16 are not subjected to a strong force for a long time, and the lifter 21 and the lock lever 16 need not be strong in structure, which simplifies the structure of the camera. Further the spring 23 doubles a spring for urging the lifter toward the entrance opening to the cartridge chamber with a spring for urging the lock lever in the locking position, whereby the number of the components of the camera can be reduced and the manufacturing cost of the camera is reduced.

Further, when the chamber lid 13 is closed with a film cartridge 1 loaded in the cartridge chamber 12 and the lifter 21 is moved to a position away from the film cartridge 1, the switch 31 is closed and the display means makes a display which indicates presence of the film cartridge 1 in the cartridge chamber 12. On the other hand, when the chamber lid 13 is closed with no film cartridge loaded in the cartridge chamber 12, the lifter 21 is not moved upward to close the switch 31, and accordingly the display means makes no display which indicates absence of the film cartridge 1 in the cartridge chamber 12. Thus absence and presence of the film cartridge in the cartridge chamber can be easily shown.

Though, in the embodiment described above, the lifter 21 is disposed on the rear side of the camera body 11, it may be disposed on the front side of the same.

Further, though, in the embodiment described above, presence and absence of the film cartridge in the cartridge chamber are shown by an electric display means, they may be shown by a display member which is moved to a position where the display member can be seen through a window in response to movement of the lifter 21 to the position away from the film cartridge 1.

What is claimed is:

1. A photographic camera comprising a cartridge chamber in which a film cartridge is loaded, a chamber lid which is movable between an opening position in which it opens an entrance opening to the cartridge chamber and a closed position in which it closes the entrance opening, a lock means which is moved to a locking position in response to movement of the chamber lid to the closed position to lock the chamber lid in the closed position and is moved to an unlocking position to release the chamber lid in response to an operation for opening the chamber lid, the lock means being urged toward the locking position by an urging means, a lifter means which is disposed in a first position where it is brought into abutment against the film cartridge when the film cartridge is loaded in the cartridge chamber, is moved by the film cartridge in response to loading of the film cartridge in the cartridge chamber to a second position where it can be brought into abutment against the chamber lid when the chamber lid is moved to the closed position, and is moved, by the chamber lid in response to movement of the chamber lid to the closed position, to a third position where it is away from the film cartridge, the lifter means being urged toward the first position by said urging means, wherein the urging means with the lock means toward the locking position and urges the lifter means toward the first position.

2. A photographic camera as defined in claim 1 in which said urging means is a spring which is connected to the lock means at one end and to the lifter means at the other end.

* * * * *

UNITED STATES PATENT AND TRADEMARK OFFICE
CERTIFICATE OF CORRECTION

PATENT NO. : 6,101,341
DATED : August 8, 2000
INVENTOR(S) : Mitsuo MANABE It is certified that error appears in the above-identified patent and that said Letters Patent are hereby corrected as shown below:

Column 8
line 50, after "means", first occurrence, please insert --urges--.

Signed and Sealed this

Seventeenth Day of April, 2001

Attest:

NICHOLAS P. GODICI

Attesting Officer     Acting Director of the United States Patent and Trademark Office